(12) United States Patent
Knebel

(10) Patent No.: US 7,782,529 B2
(45) Date of Patent: Aug. 24, 2010

(54) SCANNING MICROSCOPE AND METHOD FOR EXAMINING A SAMPLE BY USING SCANNING MICROSCOPY

(75) Inventor: Werner Knebel, Kronau (DE)

(73) Assignee: Leica Microsystems CMS GmbH (DE)

( * ) Notice: Subject to any disclaimer, the term of this patent is extended or adjusted under 35 U.S.C. 154(b) by 259 days.

(21) Appl. No.: 11/537,712

(22) Filed: Oct. 2, 2006

(65) Prior Publication Data
US 2007/0051869 A1 Mar. 8, 2007

Related U.S. Application Data

(63) Continuation of application No. PCT/EP2005/050110, filed on Jan. 12, 2005.

(30) Foreign Application Priority Data
Apr. 2, 2004 (DE) .................. 10 2004 016 253

(51) Int. Cl.
G02B 21/06 (2006.01)
G02B 21/00 (2006.01)

(52) U.S. Cl. .................. 359/385; 359/368; 359/372

(58) Field of Classification Search .......... 359/368–390
See application file for complete search history.

(56) References Cited

U.S. PATENT DOCUMENTS

| 4,657,013 | A | * | 4/1987 | Hoerenz et al. | 606/4 |
|---|---|---|---|---|---|
| 5,825,533 | A | * | 10/1998 | Yonezawa | 359/372 |
| 5,835,263 | A | * | 11/1998 | Dobschal | 359/369 |
| 6,094,300 | A | | 7/2000 | Kashima | |
| 6,355,919 | B1 | | 3/2002 | Engelhardt | |
| 2002/0020800 | A1 | * | 2/2002 | Knebel et al. | 250/201.3 |
| 2002/0196535 | A1 | | 12/2002 | Knebel | |
| 2003/0011677 | A1 | | 1/2003 | Spink | |
| 2003/0197924 | A1 | * | 10/2003 | Nakata | 359/368 |
| 2005/0078362 | A1 | * | 4/2005 | Borlinghaus | 359/385 |
| 2007/0053059 | A1 | * | 3/2007 | Gugel | 359/386 |

FOREIGN PATENT DOCUMENTS

| DE | 34 46 727 A1 | 7/1986 |
|---|---|---|
| DE | 37 34 691 A1 | 4/1988 |
| DE | 196 44 662 A1 | 4/1998 |
| DE | 198 35 068 A1 | 2/2000 |
| DE | 100 39 520 A1 | 2/2002 |
| DE | 100 43 986 A1 | 3/2002 |
| EP | 1 207 415 A1 | 5/2002 |
| JP | 59 232306 A | 5/1985 |
| WO | WO 98/13716 A | 4/1998 |

* cited by examiner

Primary Examiner—Thong Nguyen
(74) Attorney, Agent, or Firm—Houston Eliseeva, LLP

(57) ABSTRACT

A scanning microscope including a light source for generating an illumination light beam, a beam deflection apparatus for guiding solely the illumination light beam via an illumination light path over and/or through a sample, at least one objective for focusing the illumination light beam onto and/or into the sample, components for generating a manipulation illumination pattern, components for imaging the manipulation illumination pattern onto and/or into the sample via a manipulation light path, and a detection device that receives detected light emanating from the sample. The manipulation light path omits the beam deflection apparatus and is separate from the illumination light path.

30 Claims, 4 Drawing Sheets

SCANNING MICROSCOPE AND METHOD FOR EXAMINING A SAMPLE BY USING SCANNING MICROSCOPY

RELATED APPLICATIONS

This application is a Continuation of PCT application serial number PCT/EP2005/050110 filed on Jan. 12, 2005, which in turn claims priority to German application serial number 10 2004 016 253.0 filed on Apr. 2, 2004, both of which are incorporated herein by reference in their entirety.

FIELD OF THE INVENTION

The invention relates to a method for examining a sample using scanning microscopy.

The invention furthermore relates to a scanning microscope, having a light source for generating an illumination light beam, having at least one objective that focuses the illumination light beam onto and/or into a sample, having a beam deflection apparatus that guides the focus of the illumination light beam over and/or through the sample, and having a detection device that receives detected light emanating from the sample.

BACKGROUND OF THE INVENTION

In scanning microscopy, a specimen is illuminated with a light beam in order to observe the reflected or fluorescent light emitted from the specimen. The focus of the illumination light beam is moved in an object plane with the aid of a controllable beam deflection device, generally by tilting two mirrors, the deflection axes usually being perpendicular to one another so that one mirror deflects in the X direction and the other in the Y direction. Tilting of the mirrors is brought about, for example, by means of galvanometer positioning elements. The power level of the light coming from the specimen is measured as a function of the position of the scanning beam.

In confocal scanning microscopy specifically, a specimen is scanned in three dimensions with the focus of a light beam. A confocal scanning microscope generally encompasses a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illumination light is coupled in via a beam splitter. The fluorescent or reflected light coming from the specimen travels back via the beam deflection device to the beam splitter, traverses it, and is then focused onto the detection pinhole behind which the detectors are located. Detected light that does not derive directly from the focus region takes a different light path and does not pass through the detection pinhole, so that a single-point datum is obtained that results, by sequential scanning of the specimen, in a three-dimensional image. A three-dimensional image is usually achieved by acquiring image data in layers.

The samples to be examined are generally equipped with a marking, usually a fluorescent dye, that is optically excitable. These dyes can also be, for example, GFP (green fluorescence protein) or CFP (cyan fluorescence protein).

For many experiments on and examinations of biological samples, it is necessary, in addition to the microscopic observation of the sample, also to perform a manipulation of the sample. U.S. application Ser. No. 2002 0196535 A1 discloses a confocal scanning microscope with which at least one region of a sample (region of interest, ROI) can be both manipulated and observed. The manipulation, and the scanning of the region necessary for observation, are accomplished sequentially; for example, manipulation can occur in the forward direction in a line, while in the return direction the region of interest, and if applicable the surrounding area, are scanned for observation.

DE 100 43 986 A1 discloses a method for examining a sample by means of a confocal scanning microscope, in which firstly a preview image of the sample is acquired and then one or more regions of interest can be marked. Each region has specific illumination light beam wavelengths and/or illumination light beam power levels allocated to it, so that the sample can then be manipulated in the marked regions in accordance with the allocation.

For some experiments it is desirable to be able simultaneously to observe and manipulate the sample. A laser scanning microscope that permits simultaneous scanning and manipulation of a sample is known from U.S. Pat. No. 6,094,300. The laser scanning microscope contains two mutually independent beam deflection devices: one of the beam deflection devices guides the manipulation light beam over or through the sample, while the other beam deflection device directs the observation illumination light beam over or through the sample. The laser scanning microscope has the disadvantage that the light beams, namely the manipulation light beam and the scanning illumination light beam, coming from the beam deflection devices must be combined into one shared beam path, using a beam combiner, before entry into the objective. A very particular disadvantage of the necessary beam combiner is that the interference bands produced thereby in the image change during the scanning procedure because of the changes in the angle of incidence of the moving beam, and thus cannot be compensated for or calculated out in the context of image processing. The beam combiner furthermore produces a beam offset and thus results in considerable light losses.

DE 100 39 520 A1 likewise makes known a confocal scanning microscope with the capability for simultaneous manipulation and object detection. Two beam deflection devices are provided in this scanning microscope as well, one for the manipulation light beam and one for the illumination light beam. In a particular variant embodiment of this scanning microscope, the manipulation light beam is coupled into the beam path of the illumination light beam by means of the deflection mirror associated with the illumination light beam. The deflection mirror is embodied to be transparent to light having the wavelength of the manipulation light beam, and reflective for light having the wavelength of the illumination light beam.

SUMMARY OF THE INVENTION

It is an object of the present invention to describe a scanning microscope that enables both manipulation of a sample in at least one selectable region and (preferably simultaneous) observation of the sample, while omitting a beam deflection device associated with the manipulation light and the disadvantages (especially image artifacts) associated therewith.

This object is achieved by a scanning microscope which is characterized in that a means for generating a manipulation illumination pattern is provided; and that imaging means image the manipulation illumination pattern onto and/or into the sample.

A further object of the present invention is to describe a method that enables both manipulation of a sample in at least one region and (preferably simultaneous) observation of the sample, with the intention of largely avoiding the disadvantages (namely image artifacts and light output loss) known from the existing art.

This further object is achieved by a method characterized by the following steps:

focusing an illumination light beam of a light source, using at least one objective, onto and/or into a sample;

guiding the focus of the illumination light beam, using a beam deflection apparatus, over and/or through the sample;

generating a manipulation illumination pattern using a means for generating a manipulation illumination pattern;

imaging the manipulation illumination pattern onto and/or into the sample; and detecting detected light emanating from the sample, using a detection device.

BRIEF DESCRIPTION OF THE DRAWINGS

The subject matter of the invention is depicted schematically in the drawings and will be described below with reference to the Figures, in which.

DETAILED DESCRIPTION OF THE PREFERRED EMBODIMENTS

Figure 1:
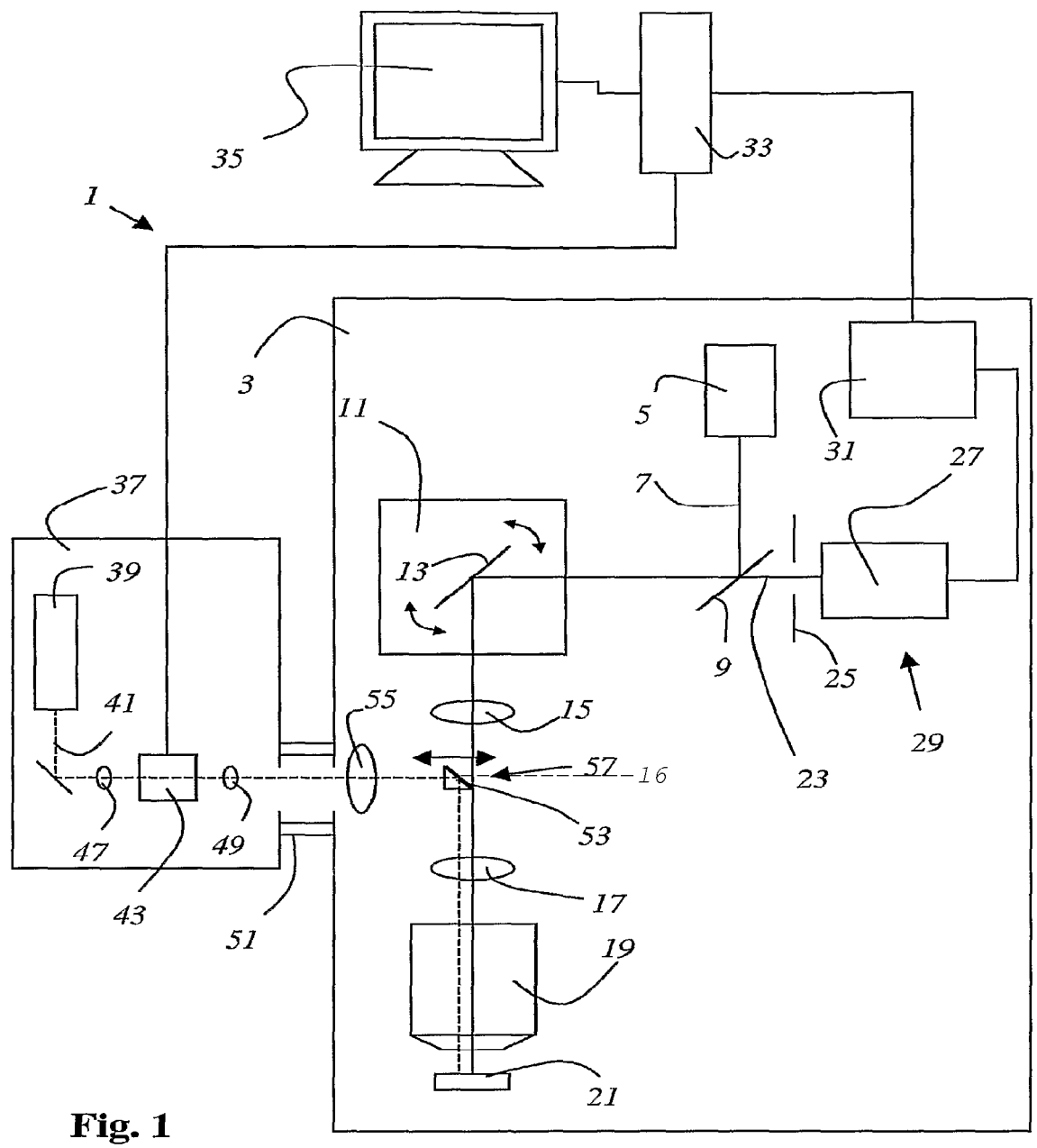
FIG. 1 shows a scanning microscope according to the present invention.

The invention has the advantage that no further manipulation beam deflection device is necessary in addition to the beam deflection device associated with the illumination light beam, since the pattern is individually adjustable to the regions that are to be manipulated The detection device preferably receives detected light emanating from individual scan points of the sample, several of the scan points being impinged upon by the light of the manipulation illumination pattern. During rapid scanning of the sample, the illumination light beam is guided continuously over the sample. In this instance, scan points are those portions of the scanning track swept by the focus of the illumination light beam during definable time intervals.

In a particularly preferred variant, provision is made for first acquiring a preview image of the sample or of a portion of the sample, and selecting from that preview image one or more manipulation regions and marking them, for example with the mouse pointer of a PC by encircling them. A computer system (e.g. a PC) calculates from these inputs the manipulation illumination pattern to be imaged, and then controls the means for generating an illumination manipulation pattern.

During illumination of the sample with the manipulation illumination pattern, it is possible simultaneously to acquire images of the sample confocally.

The means for generating a manipulation illumination pattern preferably contains at least one laser. It is also possible, however, to use other light sources, for example lamps, arc lamps, high-pressure lamps, or LEDs.

In a particular embodiment, the means for generating a manipulation illumination pattern contains a laser array, preferably a diode laser array, the individual lasers of the array being individually controllable. The output power of each single laser is preferably individually adjustable and adaptable to the particular requirements of the sample region to be manipulated.

In another variant, the means for generating an illumination manipulation pattern contains an LCD element in order to project a manipulation illumination pattern in a manner similar to that of a beamer. In a very different variant, an array of preferably individually controllable micromirrors (DMDs) is provided for generation of a manipulation illumination pattern.

In a further embodiment, the means for generating a manipulation illumination pattern contains an imageable mask that can be configured, for example, as an orifice disk or slit disk or pattern disk.

In a preferred variant, the means for generating a manipulation illumination pattern comprises an addressable fiber bundle. Microoptics are preferably used here to couple the manipulation light into the individual fibers of the fiber bundle. One end of the fiber bundle is preferably arranged directly in the intermediate image plane of the scanning microscope, and can be positioned there. The end of the fiber bundle can be curved or beveled so that the manipulation light, upon emergence from the exit surfaces of the fiber bundle into the intermediate image plane, is deflected by refraction and is directed onto the beam path of the scanning microscope. This configuration has the particular advantage that back-reflected manipulation light does not arrive at the beam deflection device and thus also not at the detector of the scanning microscope.

In a particularly preferred embodiment, the manipulation illumination pattern is imaged into an intermediate image plane of the scanning microscope.

In a preferred variant embodiment, the objective is among the imaging means that image the manipulation illumination pattern, so that the illumination light is guided through the objective. In another variant, provision is made to image the manipulation illumination light through the condenser, the condenser in this case constituting the imaging means or part of the imaging means. It is also possible, for example in a 4-pi arrangement, to image the manipulation illumination pattern both through the objective and through the condenser.

An incoupling means is preferably provided, which reflects the illumination light beam and allows the light emanating from the means for generating a manipulation illumination pattern to pass at least in part. This variant has the very particular advantage that time-variant interference patterns do not occur, since manipulation illumination light passing through the incoupling means, which means can be embodied e.g. as a dichroic beam splitter, propagates along a stationary, non-moving beam path, whereas the illumination light beam that moves during scanning is merely reflected by the incoupling means and therefore causes no interference problems as a result of multiple reflections. The incoupling means is preferably exchangeable. For this purpose, for example, multiple incoupling means can be arranged in prealigned fashion on a revolving turret or a sliding carriage, to allow easy introduction into the beam path of the scanning microscope. Stop elements or detents, which ensure correct positioning of the incoupling means, are advantageously provided in this context.

In another variant, the incoupling means allows the illumination light beam to pass at least in part, and reflects light emanating from the means for generating a manipulation illumination pattern. In this variant as well, the incoupling means can be embodied as a beam splitter, for example as a dichroic beam splitter or even as a neutral beam splitter.

In another variant, the incoupling means contains a mirror, which can be embodied e.g. as a half-mirror or as a strip mirror and which is arranged in such a way that light emanating from the means for generating a manipulation illumination pattern is reflected by the mirror into the beam path of the scanning microscope, whereas the illumination light travels at least in part past the mirror to the objective.

In another variant, the incoupling means contains a deflection prism. The incoupling means can moreover preferably contain a filter or an edge filter.

In another variant of the scanning microscope, the incoupling means contains photonic crystals, preferably ones with which individual light components can be directed in controlled fashion as if in small capillaries.

Advantageously, in a particular variant embodiment, the manipulation zone is not confined to the confocal plane, but instead a manipulation, for example bleaching, is also made possible in the planes above and below the confocal plane. In this case it is advantageous to image the focus of the manipulation illumination light into the sample in "columnar" fashion. In the context of single-point bleaching, for example, this can be achieved, inter alia, by not completely illuminating the objective pupil.

In another variant, the manipulation illumination pattern and the focus of the illumination light beam are imaged and focused into the same plane.

In order to modify the size of the imaged manipulation illumination pattern, the imaging optical system can be configured as a zoom optical system. A modification of the manipulation illumination pattern (e.g. widening) by way of additional optics is likewise conceivable.

The manipulation illumination pattern can be used for a very wide variety of manipulations; for example, bleaching of the sample and/or optical excitation and/or stimulated emission can be triggered. It is likewise conceivable to release bound dyes with the aid of the manipulation illumination pattern ($Ca^{2+}$, glutamate, etc.; caged compound release) or to induce photoactivation of compounds (PA-GFP). It is also conceivable to use the manipulation illumination pattern as an optical tweezers, or to section or divide up the sample.

The incoupling means is preferably arranged in an intermediate image plane of the scanning microscope, in the case of the half-mirror in such a way that portions in one half of the sample can be manipulated in controlled fashion. The particular advantage of this variant embodiment is that in the other half of the image, the illumination and detection beam path of the scanning microscope is entirely undisturbed. The image is not impaired by disruptive optical components, which is advantageous particularly when an AOBS (acousto-optical beam splitter) is used as the main beam splitter. Although in this variant the entire image field is not scanned, observation of the edge region of the manipulated zone, in which, for example, a bleaching operation is brought about, yields important information about the recovery behavior of the bleached molecules.

The incoupling means can also be configured as a polarizing beam splitter cube. A polarizing beam splitter has the particular advantage that on the one hand the illumination light power level is variably adjustable using an additional rotatable λ/2 plate, and half of the fluorescent light can pass through the polarizing beam splitter in order to be detected.

When manipulation light of a single wavelength is used, the incoupling means can advantageously be made up of an edge filter. The beam offset produced by the edge filter can be corrected by back-calculation and image correction, thus making it possible to evaluate the entire image field. Back-reflections of the manipulation light are also blocked, and thus advantageously do not reach the detector of the scanning microscope.

Condenser-side incoupling of the manipulation light has the advantage that the scanning image field is not restricted. An alignment capability should exist, however, so that the focal planes of the illumination light beam and of the manipulation illumination pattern can be brought into congruence or, if desired, allowed to overlap slightly.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

FIG. 1 shows a scanning microscope 1 according to the present invention that contains an imaging module 3 and a modularly attached means 37 for generating a manipulation illumination pattern. Imaging module 3 contains a light source 5 that emits an illumination light beam 7. Illumination light beam 7 is reflected by main beam splitter 9 to a beam deflection device 11 that contains a gimbal-mounted scanning mirror 13. Beam deflection device 11 guides illumination light beam 7 through scanning optical system 15, tube optical system 17, and microscope objective 19 and over or through sample 21. Detected light 23 emanating from sample 21 travels along the same light path, i.e. through microscope objective 19, tube optical system 17, scanning optical system 15, and via beam deflection device 11 back to main beam splitter 9, traverses the latter and detection pinhole 25 that follows it, and lastly arrives at a detector 29 that is configured as a photomultiplier 27. Detector 29 generates electrical detected signals proportional to the power level of detected light 23, which are transferred to a processing unit 31. In processing unit 31, the detected signals are allocated to the corresponding position signals and then transferred to a PC 33, on whose screen 35 an image of the sample is displayed. Means 37 for generating a manipulation illumination pattern is attached to the imaging module via a bayonet connector 51. Means 37 for generating a manipulation illumination pattern contains a laser 39 whose manipulation light 41 travels via optical system 47 to LCD element 43. LCD element 43 is controlled by PC 33, and generates the manipulation illumination pattern that is imaged via optical systems 49, 55 into the intermediate image plane 16 of the scanning microscope. The manipulation illumination pattern is deflected, by an incoupling means 57 that is embodied as a prism 53 and is arranged in the intermediate image plane 16, to tube optical system 17, which together with microscope objective 19 images the manipulation illumination pattern onto or into sample 21. Incoupling means 57 is arranged displaceably in such a way that the portion that is effective in the beam path of the scanning microscope is variable.

Figure 2:
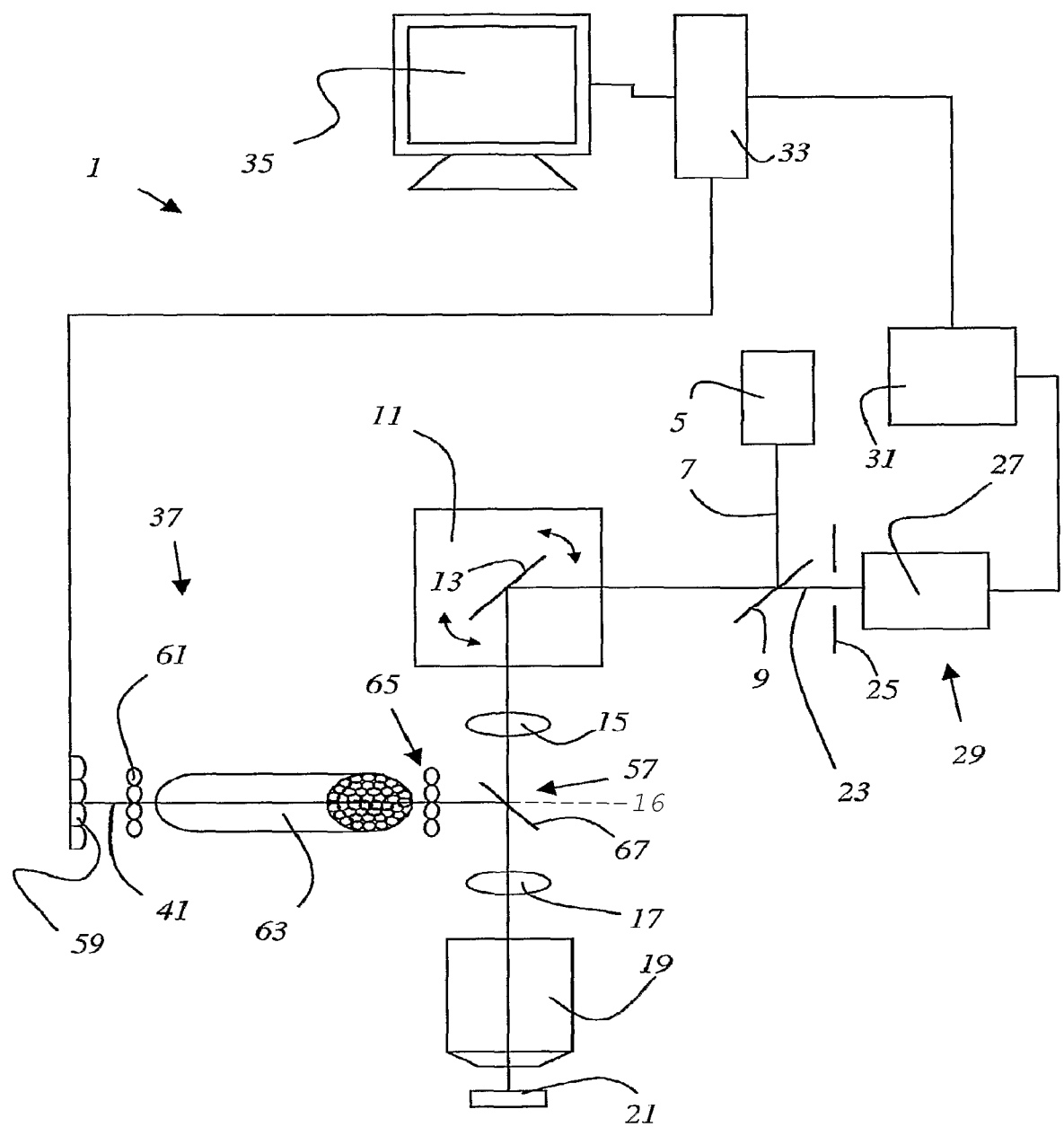
FIG. 2 shows another variant embodiment of a scanning microscope according to the present invention.

FIG. 2 shows a variant of the scanning microscope according to the present invention in which means 37 for generating a manipulation illumination pattern encompasses a laser diode array 59 of individually switchable laser diodes. Manipulation light 41 emanating from the laser diode array is imaged by a microoptical system 61 onto an optical fiber bundle 63. In order to couple manipulation light 41 out of optical fiber bundle 63, a further microoptical system 65 is provided which images the manipulation illumination pattern into the intermediate image field of the scanning microscope.

An incoupling means 57, which in this variant is embodied as a dichroic beam splitter 67, is provided in the intermediate image plane 16. The manipulation illumination pattern that is imaged by tube optical system 17 and microscope objective 19 into sample 21 can be varied by switching the individual diodes of laser diode array 59. As a result, each individual fiber of the fiber bundle is, de facto, individually addressable.

Figure 3:
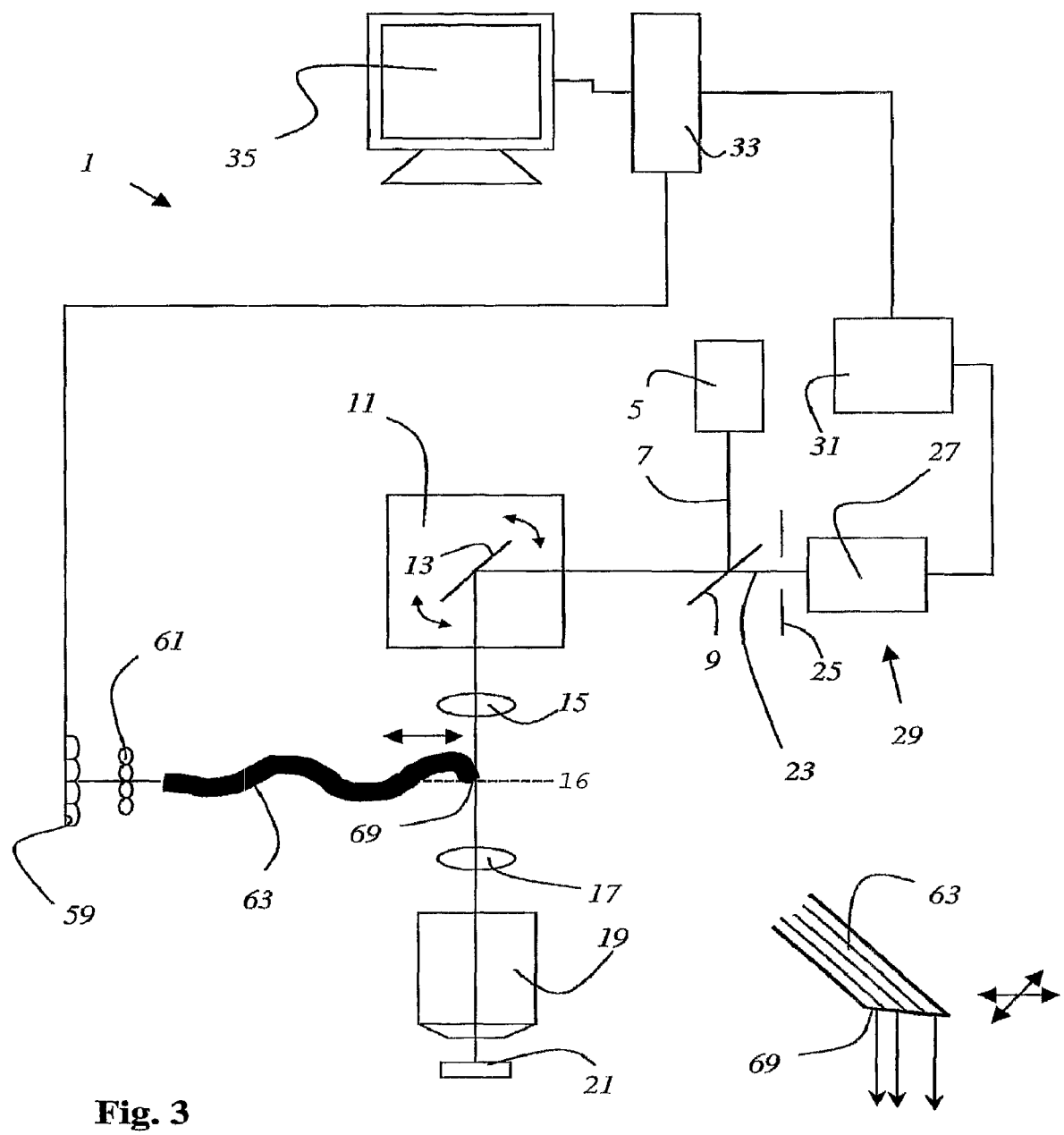
FIG. 3 shows a further embodiment of a scanning microscope according to the present invention.

FIG. 3 shows a further variant of a scanning microscope according to the present invention having an addressable optical fiber bundle 63. In this variant, the beveled end surface 69 of optical fiber bundle 63 is arranged directly in the intermediate image plane 16. The manipulation light emerging from optical fiber bundle 63 is deflected by refraction, and directed onto the beam path of the scanning microscope. In this variant, tube optical system 17 and microscope objective 19 image end surface 69 of optical fiber bundle 63 into sample 21. The end of optical fiber bundle 63 can be positioned in controlled fashion in the intermediate image plane 16, as indicated by the double arrow. The positioning is controlled by processing unit 31 and by PC 33.

Figure 3A:
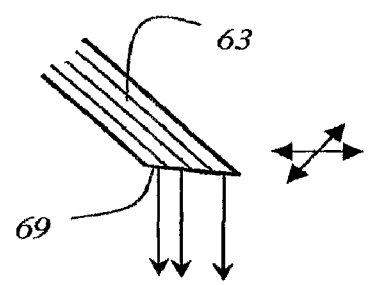

FIG. 3a is a detail view of the end of optical fiber bundle 63. Depending on how laser diode array 59 is activated, manipulation light emerges from the individual fibers of optical fiber bundle 63, the power level of polarized light 41 passing through the individual fibers of optical fiber bundle 63 being controllable by PC 33.

Figure 4:
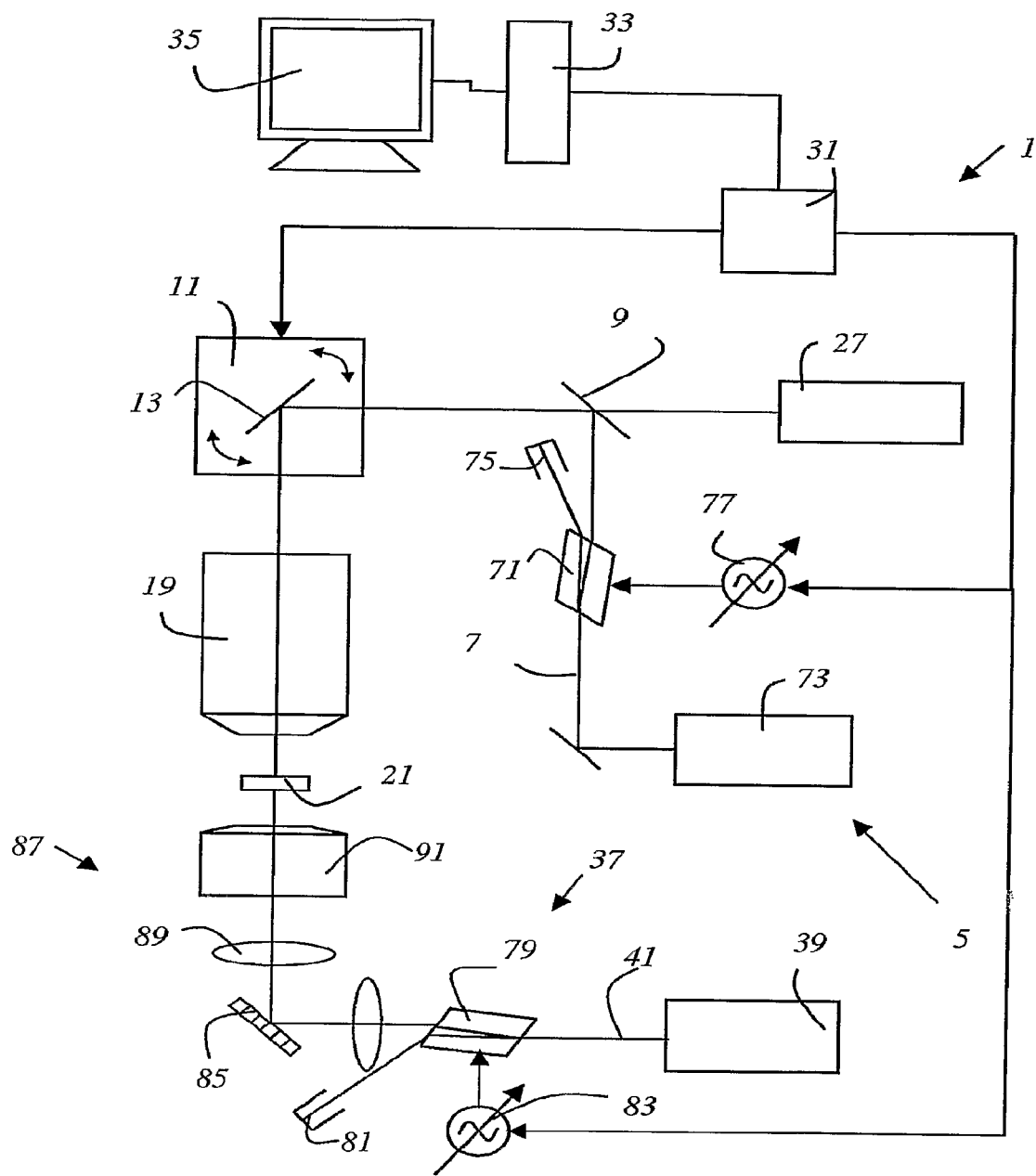
FIG. 4 shows a further variant of a scanning microscope according to the present invention.

FIG. 4 shows another embodiment of a scanning microscope 1 according to the present invention. Scanning microscope 1 contains a light source 5 that emits an illumination light beam 7 that is directed through an acoustooptical filter 71 (AOTF=acoustooptical tunable filter) to main beam splitter 9. Light source 5 is embodied as a multiple-line laser 73. With the aid of acoustooptical filter 71, it is possible to select which spectral component of illumination light 7 is to travel through the main beam splitter to beam deflection device 11 and, via the scanning and tube optical systems (not shown) and microscope objective 19, to sample 21. The spectral components that are not directed onto the beam path of the scanning microscope travel into a beam trap 75. Acoustooptical filter 71 is driven via a high-frequency transmitter 77 that is regulated by a processing unit 31. Scanning microscope 1 comprises a means 37 for generating a manipulation illumination pattern, which means contains a laser 39 that emits manipulation light 41. Those spectral components that are to be imaged for the manipulation of sample 21 are selected from manipulation light 41 with a further acoustooptical filter 79. All the other spectral components travel into a further light trap 81. Further acoustooptical filter 79 is driven via a further high-frequency transmitter 83. Means 37 for generating a manipulation illumination pattern contains a controllable micromirror array 85. The manipulation illumination pattern is generated by exerting control on the individual mirrors of micromirror array 85. The manipulation illumination pattern is imaged into the sample with imaging means 87 that contain a field lens 89 and a condenser 91.

The invention has been described with reference to a particular embodiment. It is self-evident, however, that changes and modifications can be made without thereby leaving the range of protection of the claims below.

While this invention has been particularly shown and described with references to preferred embodiments thereof, it will be understood by those skilled in the art that various changes in form and details may be made therein without departing from the scope of the invention encompassed by the appended claims.

What is claimed is:

1. A scanning microscope, comprising:
    a light source for generating an illumination light beam,
    a beam deflection apparatus for guiding solely the illumination light beam via an illumination light path over and/or through a sample,
    at least one objective for focusing the illumination light beam onto and/or into the sample,
    means for generating a manipulation illumination pattern,
    means for imaging the manipulation illumination pattern onto and/or into the sample via a manipulation light path, and
    a detection device for receiving detected light emanating from the sample,
    wherein the manipulation light path is arranged for omitting the beam deflection apparatus,
    wherein the manipulation light path is separate from the illumination light path, and
    wherein the means for generating a manipulation illumination pattern comprises a liquid crystal display element.

2. The scanning microscope according to claim 1, wherein the detection device is adapted for receiving detected light emanating from individual scan points of the sample; and wherein the image of the manipulation illumination pattern encompasses several scan points.

3. The scanning microscope according to claim 1, wherein the means for generating a manipulation illumination pattern comprises at least one laser.

4. The scanning microscope according to claim 1, wherein the manipulation illumination pattern and a focus of the illumination light beam are imageable into the same plane.

5. The scanning microscope according to claim 1, wherein the manipulation illumination pattern is adapted to provide at least one of the following: bleaching the sample, optically exiting the sample, triggering induced emission, triggering a release of bound dyes, and inducing photoactivation.

6. The scanning microscope according to claim 1, wherein the scanning microscope is a confocal scanning microscope.

7. A scanning microscope, comprising:
    a light source for generating an illumination light beam,
    a beam deflection apparatus for guiding solely the illumination light beam via an illumination light path over and/or through a sample,
    at least one objective for focusing the illumination light beam onto and/or into the sample,
    means for generating a manipulation illumination pattern,
    means for imaging the manipulation illumination pattern onto and/or into the sample via a manipulation light path, and
    a detection device for receiving detected light emanating from the sample,
    wherein the manipulation light path is arranged for omitting the beam deflection apparatus,
    wherein the manipulation light path is separate from the illumination light path,
    wherein the scanning microscope comprises an intermediate image plane, and
    wherein the manipulation illumination pattern is imageable into the intermediate image plane.

8. The scanning microscope according to claim 7, wherein the means for generating a manipulation illumination pattern comprises a laser array.

9. The scanning microscope according to claim 7, wherein the means for generating a manipulation illumination pattern comprises an addressable fiber bundle.

10. The scanning microscope according to claim 7, further comprising incoupling means reflecting the illumination light beam and allowing the light emanating from the means for generating a manipulation illumination pattern to pass at least in part or incoupling means allowing the illumination light beam to pass at least in part, and reflecting the light emanating from the means for generating manipulation illumination pattern.

11. The scanning microscope according to claim 10, wherein the incoupling means comprises a mirror.

12. The scanning microscope according to claim 10, wherein the incoupling means comprises a beam splitter.

13. The scanning microscope according to claim 10, wherein the incoupling means comprises a filter.

14. The scanning microscope according to claim 10, wherein the incoupling means comprises photonic crystals or diffractive optics.

15. A scanning microscope, comprising:
a light source for generating an illumination light beam,
a beam deflection apparatus for guiding solely the illumination light beam via an illumination light path over and/or through a sample,
at least one objective for focusing the illumination light beam onto and/or into the sample,
means for generating a manipulation illumination pattern,
means for imaging the manipulation illumination pattern onto and/or into the sample via a manipulation light path,
incoupling means allowing the illumination light beam to pass at least in part, and reflecting the light emanating from the means for generating a manipulation illumination pattern, and
a detection device for receiving detected light emanating from the sample,
wherein the manipulation light path is arranged for omitting the beam deflection apparatus,
wherein the manipulation light path is separate from the illumination light path,
wherein the imaging means comprises at least one objective,
wherein the manipulation illumination pattern is imageable through the at least one objective,
wherein the incoupling means comprises a prism or a grating, and
wherein the means for generating a manipulation illumination pattern comprises a liquid crystal display element or wherein the scanning microscope comprises an intermediate image plane and the manipulation illumination pattern is imageable into the intermediate image plane.

16. A method for examination of a sample by scanning microscopy, comprising the steps of:
guiding an illumination light beam of a light source over and/or through the sample via an illumination light path by using a beam deflection apparatus;
focusing the illumination light beam onto and/or into the sample by using at least one objective;
generating a manipulation illumination pattern by using means for generating a manipulation illumination pattern;
imaging the manipulation illumination pattern onto and/or into the sample via a manipulation light path by using imaging means; and
detecting detected light emanating from the sample by using a detection device;
wherein the manipulation light path is arranged for omitting the beam deflection apparatus,
wherein the manipulation light path is separate from the illumination light path, and
wherein the means for generating a manipulation illumination pattern comprises a liquid crystal display element.

17. The method according to claim 16, further comprising the steps of:
acquiring a preview image;
selecting a manipulation region from the preview image; and
imaging the manipulation illumination pattern onto the manipulation region.

18. The method according to claim 16, wherein the detection device is adapted for receiving detected light emanating from individual scan points of the sample; and wherein the image of the manipulation illumination pattern encompasses several scan points.

19. The method according to claim 16, wherein the means for generating a manipulation illumination pattern comprises at least one laser.

20. The method according to claim 16, wherein the manipulation illumination pattern and a focus of the illumination light beam are imageable into the same plane.

21. The method according to claim 16, wherein the manipulation illumination pattern is adapted to provide at least one of the following: bleaching the sample, optically exiting the sample, triggering induced emission, inducing photoactivation, and releasing components by means of light.

22. A method for examination of a sample by scanning microscopy, comprising the steps of:
guiding an illumination light beam of a light source over and/or through the sample via an illumination light path by using a beam deflection apparatus;
focusing the illumination light beam onto and/or into the sample by using at least one objective;
generating a manipulation illumination pattern by using means for generating a manipulation illumination pattern;
imaging the manipulation illumination pattern onto and/or into the sample via a manipulation light path by using imaging means; and
detecting detected light emanating from the sample by using a detection device;
wherein the manipulation light path is arranged for omitting the beam deflection apparatus,
wherein the manipulation light path is separate from the illumination light path,
wherein the scanning microscope comprises an intermediate image plane,
and wherein the manipulation illumination pattern is imageable into the intermediate image plane.

23. The method according to claim 22, wherein the means for generating a manipulation illumination pattern comprises a laser diode array.

24. The method according to claim 22, wherein the means for generating a manipulation illumination pattern comprises an addressable fiber bundle.

25. The method according to claim 22, further comprising the step of incoupling light emanating from the means for generating a manipulation illumination pattern by using an incoupling means allowing the light emanating from the means for generating a manipulation illumination pattern to pass at least in part and reflecting the illumination light beam or an incoupling means allowing the illumination light beam to pass at least in part and reflecting light emanating from the means for generating a manipulation illumination pattern.

26. The method according to claim 25, wherein the incoupling means contains a mirror.

27. The method according to claim 25, wherein the incoupling means comprises a beam splitter.

28. The method according to claim 25, wherein the incoupling means comprises a filter.

29. The method according to claim 25, wherein the incoupling means comprises photonic crystals or diffractive optics.

30. A method for examination of a sample by scanning microscopy, comprising the steps of:
- guiding an illumination light beam of a light source over and/or through the sample via an illumination light path by using a beam deflection apparatus;
- focusing the illumination light beam onto and/or into the sample by using at least one objective;
- generating a manipulation illumination pattern by using means for generating a manipulation illumination pattern;
- imaging the manipulation illumination pattern onto and/or into the sample via a manipulation light path by using imaging means;
- detecting detected light emanating from the sample by using a detection device; and
- incoupling light emanating from the means for generating a manipulation illumination pattern by using an incoupling means allowing the illumination light beam to pass at least in part and reflecting light emanating from the means for generating a manipulation illumination pattern;

wherein the manipulation light path is arranged for omitting the beam deflection apparatus, wherein the manipulation light path is separate from the illumination light path, wherein the imaging means comprise at least one objective, wherein the manipulation illumination pattern is imageable through the at least one objective, wherein the incoupling means comprises a prism, and wherein the means for generating a manipulation illumination pattern comprises a liquid crystal display element or wherein the scanning microscope comprises an intermediate image plane and the manipulation illumination pattern is imageable into the intermediate image plane.

* * * * *